(12) United States Patent
Leon

(10) Patent No.: US 6,360,865 B1
(45) Date of Patent: Mar. 26, 2002

(54) CLUSTER ROLLER ASSEMBLY WITH IMPROVED ROLLER

(75) Inventor: Michael A. Leon, Orlando, FL (US)

(73) Assignee: FMC Corporation, Chicago, IL (US)

(*) Notice: Subject to any disclaimer, the term of this patent is extended or adjusted under 35 U.S.C. 154(b) by 0 days.

(21) Appl. No.: 09/572,626

(22) Filed: May 17, 2000

(51) Int. Cl.$^7$ ............................................. B65G 13/00
(52) U.S. Cl. ................................................. 193/35 MD
(58) Field of Search ........................... 193/35 MD, 37; 198/780, 786, 457.02

(56) References Cited

U.S. PATENT DOCUMENTS

| | | | |
|---|---|---|---|
| 3,590,970 A | 7/1971 | Kornylak | 193/37 |
| 3,874,491 A | * 4/1975 | Faure | 193/35 MD |
| 3,923,150 A | 12/1975 | Jager | 198/127 |
| 3,976,177 A | * 8/1976 | Brown | 193/35 MD X |
| 4,348,150 A | 9/1982 | Inghram et al. | 414/529 |
| 4,475,648 A | 10/1984 | Weeks | 198/830 |
| 4,681,203 A | 7/1987 | Kornylak | 193/35 R |
| D294,074 S | 2/1988 | Sogge | D34/29 |
| 4,907,692 A | 3/1990 | Sogge | 198/780 |
| 4,981,209 A | 1/1991 | Sogge | 198/786 |
| 5,064,045 A | 11/1991 | Leon | 193/35 |
| 5,096,050 A | 3/1992 | Hodlewsky | 198/779 |
| 5,261,526 A | 11/1993 | Rombouts | 198/789 |
| 5,404,984 A | 4/1995 | Hagman | 193/35 |
| 5,642,800 A | 7/1997 | East | 193/37 |
| 5,655,642 A | 8/1997 | Lawrence et al. | 193/37 |
| 5,875,878 A | 3/1999 | Pierson | 193/37 |

FOREIGN PATENT DOCUMENTS

JP 5-319541 * 12/1993 ........... 193/35 MD

OTHER PUBLICATIONS

Product Brochure, "The Revvo Cargocaster," An Innovative Solution to Air Cargo Handling, Revvo Castor Company, Ltd., two pages, 1994.
Product Brochure, "Moving in the Right Direction, Castors and Wheels," Revvo Castor Company, Ltd., seven pages, 1994.

* cited by examiner

Primary Examiner—James R. Bidwell
(74) Attorney, Agent, or Firm—Wood, Herron & Evans, L.L.P.

(57) ABSTRACT

A cluster roller assembly used in material handling includes a body member for mounting a driven shaft. The body member includes a periphery having a plurality of roller support positions. A roller is supported at each roller support position. A central bore extends through either end of the roller and defines an axis of rotation. A bearing recess is formed at either end of the roller and a pair of rolling element bearings are each fitted within the bearing recess and each has an inner race. A roller shaft extends through the central bore and the rolling element bearings and engages at either end a pair of support legs for supporting the roller between the support legs. In one aspect, a spacer engages the rolling element bearing and the inner race to pass the thrust of the roller through the spacer to the body member. The rolling element bearings can be sealed.

17 Claims, 4 Drawing Sheets

CLUSTER ROLLER ASSEMBLY WITH IMPROVED ROLLER

FIELD OF INVENTION

This invention relates to shaft mounted drive components, and more particularly, this invention relates to a shaft mounted cluster roller assembly used in material handling applications.

BACKGROUND OF THE INVENTION

Cluster roller assemblies are used in container translating and orienting apparatus, such as disclosed in U.S. Pat. Nos. 4,981,209 and 5,064,045 assigned to FMC Corporation, the disclosures which are hereby incorporated by reference in their entirety. In these types of apparatus, the movement of flat bottomed articles is controlled in a plurality of different directions relative to a supporting platform. The article is supported on a plurality of clusters of helically arranged, freely rotatable rollers mounted on a plurality of shafts. The different shafts or groups of shafts lie in one of a plurality of zones and are selectively driven in a clockwise direction, a counter-clockwise direction, or held stationary. Selective control of various drive shafts enables the apparatus to move an article parallel to the longitudinal axis of the platform in two selected directions, perpendicular to the longitudinal axis in two selected directions, diagonally of the longitudinal axis in four selected directions, and either clockwise or counter-clockwise about an axis normal to the flat bottom of the article.

The 45° angle of a roller relative to a body member and the use of the conveyor platform in adverse environments causes dirt, aluminum oxides and other contaminants to pass through the roller inside the various bushings, reducing the usable life of a roller by three or four times. One example of the type of bushing and washer used with a cluster roller assembly as described is disclosed in U.S. Pat. No. 5,064,045 assigned to FMC Corporation, the disclosure which is hereby incorporated by reference in its entirety.

In that patent, a cluster roller assembly for material handing conveyor has a plurality of rollers mounted on a body member at an acute angle to the axis defined by the drive shaft. A bushing is pressed into and recessed from each end of the roller to provide a consistent, frictional force between the roller and the body member under various conditions of moisture. The roller is mounted for rotation on a shaft and extends between a pair of outwardly, extending support legs formed on the body member along the periphery. The shaft is retained in this position and restrained from rotation by a flat formed on one end of the shaft which end terminates in a reduced diameter threaded portion for receiving a nut.

Flat washers are positioned on the roller shaft between the ends of the roller and the inner side of the support legs. These washers are made of a hard material having a low coefficient of friction with the body member, e.g., an aluminum alloy. The washers in that disclosure could be molybdenum filled nylon. The bushings are a material compatible with the roller shaft, typically made from stainless steel, and possesses a low coefficient of friction. One type of bushing used in those applications is a mild steel coated with a porous bronze, which has been impregnated with polytetrafluoroethylene and lead.

This combination of flat nylon washers at the ends of the roller and bushings engage the steel shaft. However, accuracy is not always provided in wet conditions. The oil that provides lubrication could be washed out while contaminants are washed into the rollers. The rolling friction could increase to a point where any ULD control is lost because of side shift and rotation functions. Although the washer and composite bushings at each end of the rollers can reduce rolling friction, the contaminants enter the roller between the bushing and pin, or roller shaft, on which the roller rotates, as well as thrust washer areas, which shortens the useful life of the bushings and thrust washers. It is therefore essential to provide a roller that can operate efficiently in very wet climates and withstand to a greater degree the contaminants that pass into the rollers, and also provide for full operation as described above over extended years of service.

SUMMARY OF THE INVENTION

In accordance with the present invention, a cluster roller assembly for use in material handling includes a body member that mounts on a driven shaft. The body member includes a periphery having a plurality of roller support positions. A pair of support legs are mounted at each roller support position. A roller is supported by each pair of support legs, and each roller includes a central bore extending through either end of the roller to define an axis of rotation.

A bearing recess is formed at either end of the roller. A pair of rolling element bearings are each fitted within the bearing recess and each has an inner race. A roller shaft extends through the central bore. The rolling element bearings engage at either end a pair of support legs formed on the body member, which support the roller. In one aspect of the invention, it is possible to include a spacer that engages the rolling element bearing and engages the inner race of the rolling element bearing and passes the thrust load of the roller onto the spacer and the body member. It is also possible to use an extended inner race that engages the support area of the casting. It is also possible that the rolling element bearing is sealed.

In still another aspect of the present invention, if a spacer is used, the spacer includes a circumferentially extending mounting flange that frictionally engages the rolling element bearing to retain the annular spacer onto the rolling element bearing. It also can provide a seal. Rollers are disposed at an acute angle relative to the axis of rotation. Rollers also have an outer surface that is barrel shaped and configured to trace a helical pattern of contact with an article.

In still another aspect of the present invention, a conveyor permits translation or rotation of an article and includes a frame and a plurality of drive shafts rotatably mounted on the frame and positioned substantially parallel to each other. Each drive shaft includes a plurality of cluster roller assemblies mounted thereon. Each of the cluster roller assemblies comprises a body member having a periphery and plurality of roller support positions along the periphery. A pair of support legs are formed at each roller support position and a roller is supported by each pair of support legs. The roller is formed as before with a central bore, bearing recess, rolling element bearings, roller shaft and spacer.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention is advantageous because it now permits a cluster roller assembly to be used with a conveyor platform in adverse conditions, such as a wet environment, and prolonging the life of a roller by three or four times. The use of the pair of rolling element bearings can maintain the longer operation and lubrication necessary for operation. If a spacer is used, the spacer engages the rolling element bearing and the inner race of the rolling element bearing, and passes the thrust load of the roller through the spacer to the body member. It also provides a seal to the rolling element bearing against contaminants and moisture. In yet another aspect, the rolling element bearing is sealed and has an extended inner race that engages the support area of the casting. This is especially relevant when no spacer is used.

Figure 1:
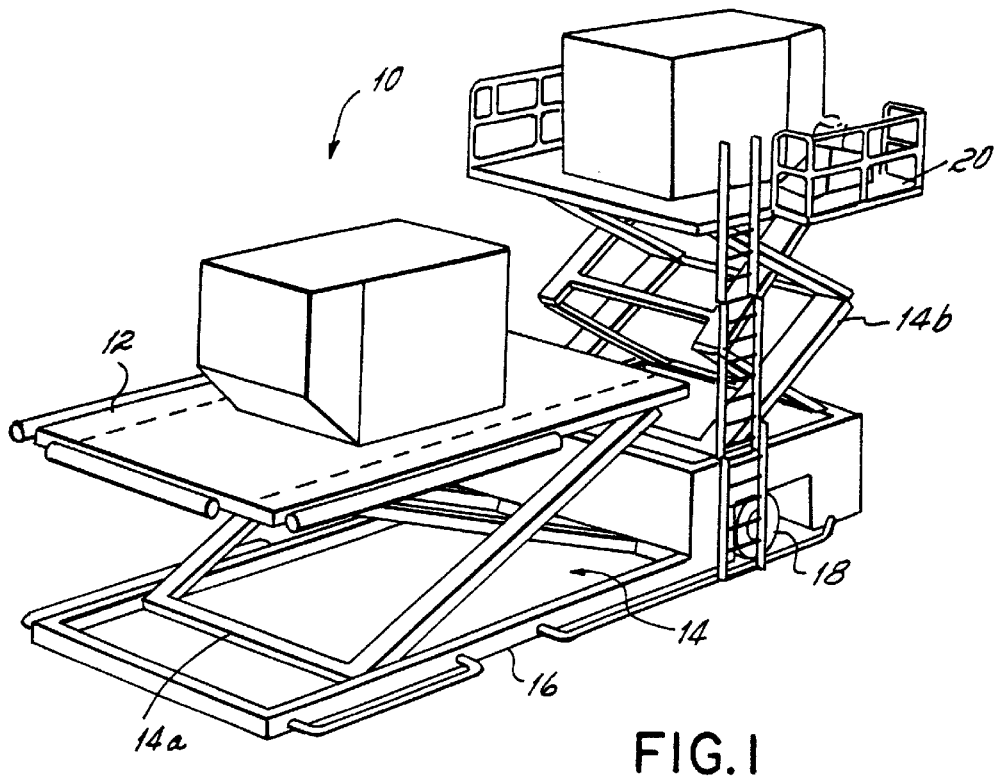
FIG. 1 is an isometric view of a container/pallet loader platform having drive shafts where the cluster roller assemblies are mounted on the drive shafts.

Referring now to FIG. 1, there is illustrated a universal container/pallet loader at 10 that would incorporate the roller cluster assembly and method of the present invention. The illustrated container/pallet loader 10 is only one type of loader design that could be used with the present invention. The illustrated universal loader design is manufactured and sold by FMC Corporation of Orlando, Florida, commonly under the trade designation, Commander 15.

As illustrated, the loader 10 includes a conveyor platform 12 that is supported on a scissors lift mechanism 14 and actuated by a drive mechanism (not shown) contained within a motor and drive housing. The main frame 16 supporting the scissors lift mechanism 14 is supported on wheel modules 18 that provide a small turning radius, along with excellent stability and long-distance driveability. In the illustrated universal loader 10, the scissors lift mechanism 14 includes front and rear lift mechanisms 14a, 14b, supported on the main frame 16. A powered operator platform 20 is moveable with the front scissors lift 14b. The wheel modules 18 include smaller wheels under the rear frame (not shown) and larger wheels 18a in the front that are steerable from the powered operator platform 20.

Figure 2:
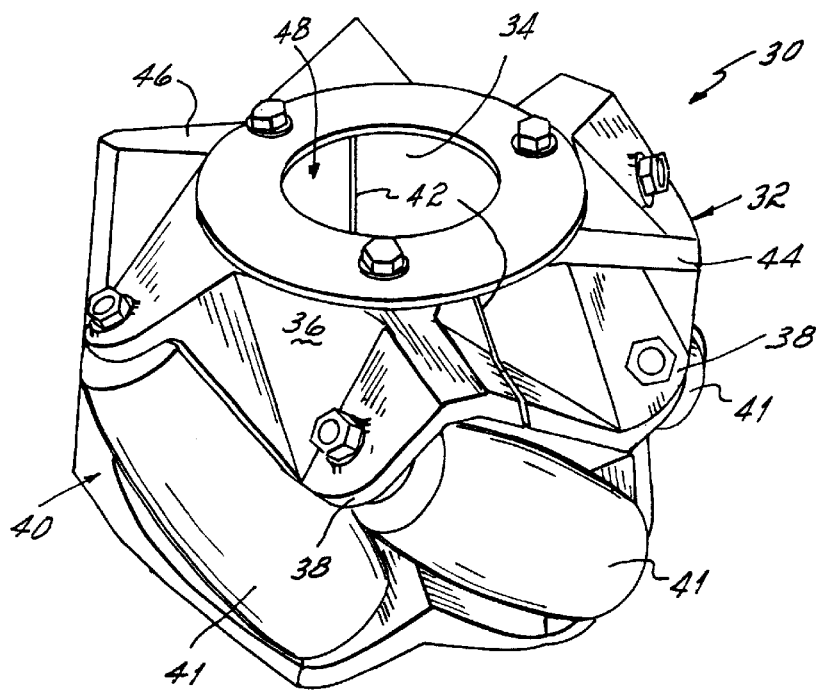
FIG. 2 is an isometric view of a cluster roller assembly showing rollers supported along the periphery of a body member.

FIG. 2 illustrates a cluster roller assembly 30 that can be used in the present invention, and showing a body member 32 that is formed as a hub 34 and end flanges 36 having support legs 38 extending outward from either end of the hub and defining six roller support positions 40. Rollers 41 are positioned around the periphery thereof and supported by the support legs at roller support positions. Although the illustrated embodiment of the body member shown in FIG. 2 is a cast aluminum body member that has been split in half by sawing via a cut forming a gap 42, the body member 32 could be formed as an integrally cast, one-piece unit. In the assembly of FIG. 2, the split body member, i.e., split hub, is useful for facilitating replacement of a broken cluster roller assembly with a good cluster roller assembly.

With the two-part design, a body member 32 has first and second half members 44,46 and an opening 48 defining a central axis through which a drive shaft (FIG. 8) is received for mounting the body member 32 on the shaft. The first and second half members 44,46 are divided by the cut 42 along the central axis. The body member 32 has a plurality of alignment holes (not shown) split by the cut. A spacer pin (not shown) can be received within each alignment hole and is substantially the same diameter as each alignment hole. The spacer pin also has a diameter larger than the gap formed by the cut or "kerf" to maintain alignment and position of the half members and rollers 41 as before splitting and facilitating the replacement of first and second half members on a shaft. The rollers 41 are mounted at an acute angle relative to the axis of rotation of the body member 32.

Figure 8:
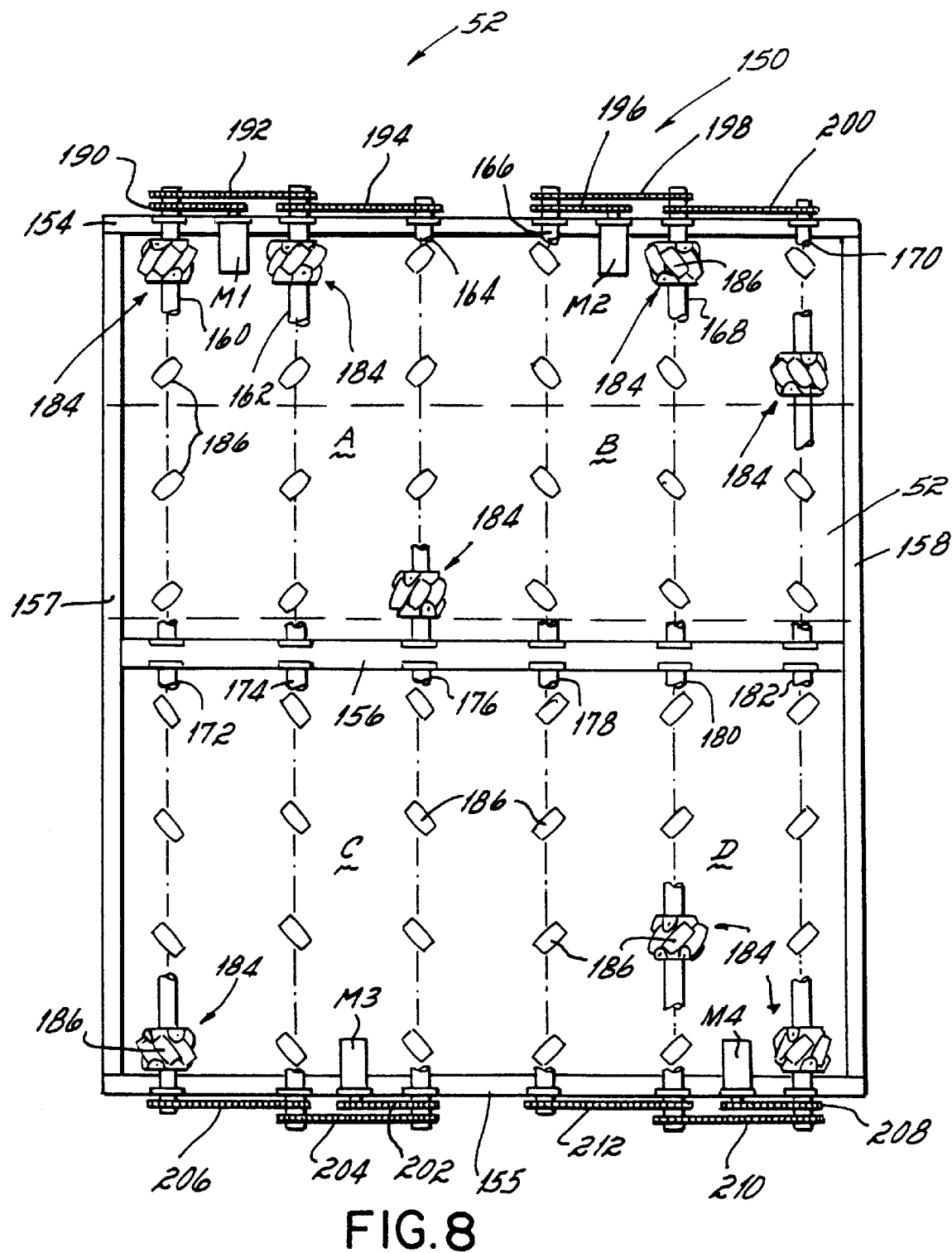
FIG. 8 is a top plan view of an example of a loader platform showing operation of various drive shafts and cluster roller assemblies.

In one aspect of the present invention, the rollers 41 are barrel configured, and when placed in a cluster roller assembly in a conveyor platform, the acute angle and the configuration barrel shaped roller on the outer surface allows the configuration to trace a helical pattern of contact. Typically, a portion of the cluster roller assembly would extend upward beyond any walk plates 50 on a conveyor platform 52 to engage an article (FIG. 8).

Each roller 41 is supported by a pair of support legs 38 that define roll support positions 56 (FIG. 2). Each roller 41 includes a central bore 60, FIGS. 3–5, which extends to either end of the roller 41 and defines an axis of rotation for the roller. A bearing recess 62 is formed at either end of the roller 41. A pair of rolling element bearings 64 are provided with one each fitted within the bearing recess 62 and each having an inner race 66 and an outer race 68, as is known to those skilled in the art. The rolling element bearings can be sealed. A roller shaft 70 extends through the central bore 60 and the opening of rolling element bearings 64 and engages at either end a pair of support legs 38 for supporting the roller between the support legs. In one aspect of the present invention, a spacer 72 engages the rolling element bearing to engage the inner race 66 of the rolling element bearing and pass the thrust load of the roller through the spacer to the cast body member 32. It is possible to have an extended inner race that engages the support area of the casting as an option, especially if no spacer is used.

The rolling element bearing 64 can be formed from a bearing steel, and the roller 41 can be formed from stainless steel. The roller shaft 70 can also be formed from stainless steel and includes a threaded end 74 and a flat 76 formed adjacent the threaded end of the roller shaft to engage a corresponding recess or other D-shaped hole (not shown) in the support leg, preventing the shaft from rotating.

Figure 3:
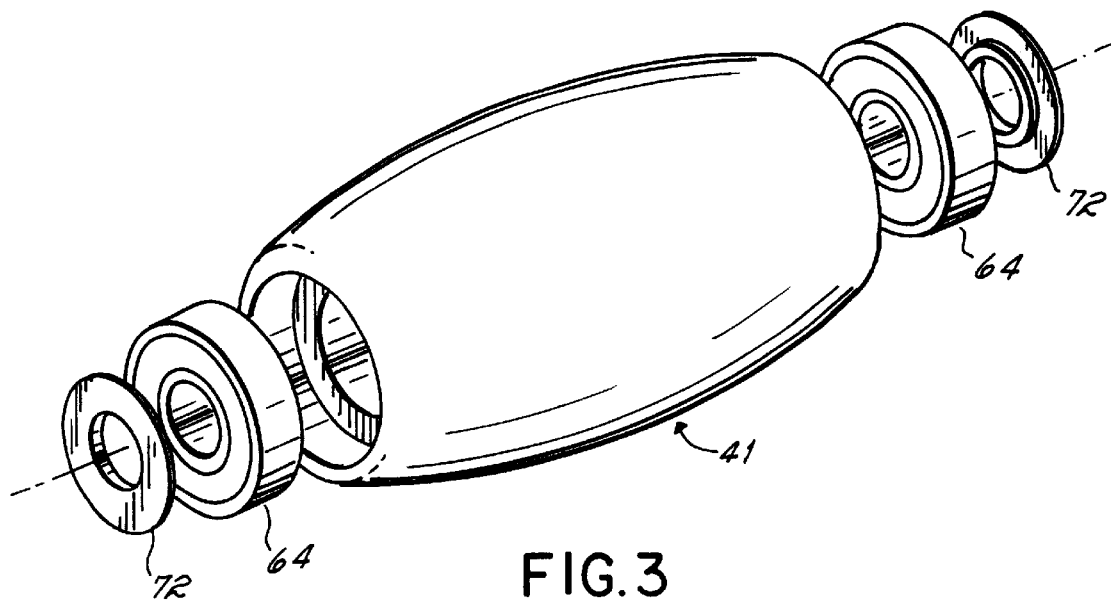
FIG. 3 is an exploded, isometric view of a roller of the present invention showing the sealed rolling element bearings and spacer that engages the rolling element bearing and the inner race.
Figure 4:
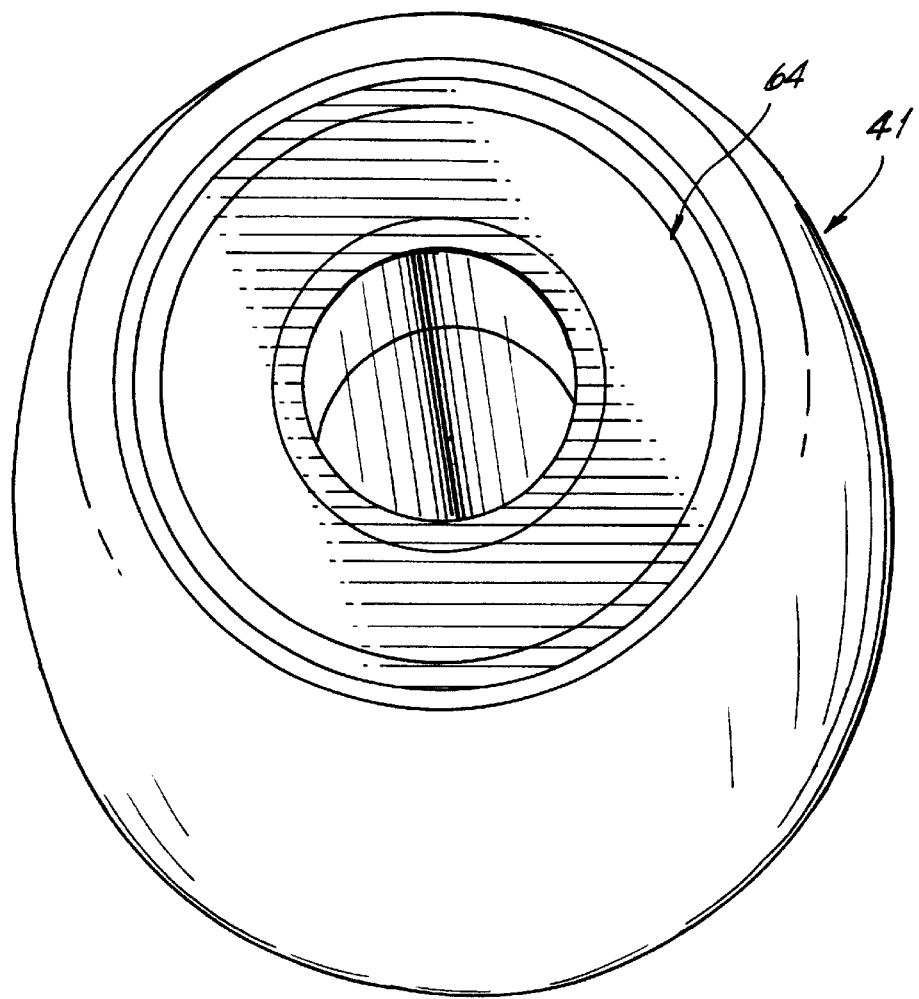
FIG. 4 is an enlarged isometric view of a roller and looking at the end of the roller.
Figure 5:
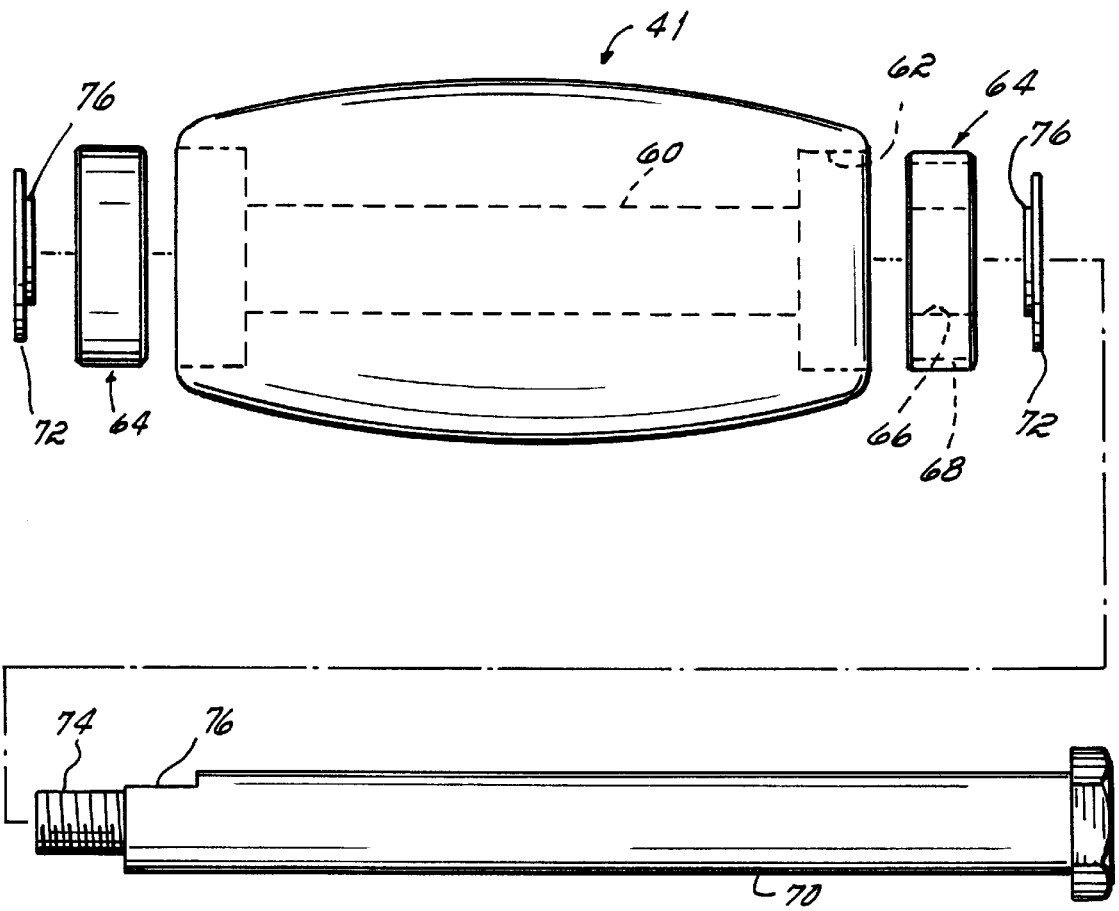
FIG. 5 is a fragmentary, exploded elevation view of a roller showing the roller, sealed rolling element bearings, roller shaft and spacer.
Figure 6:
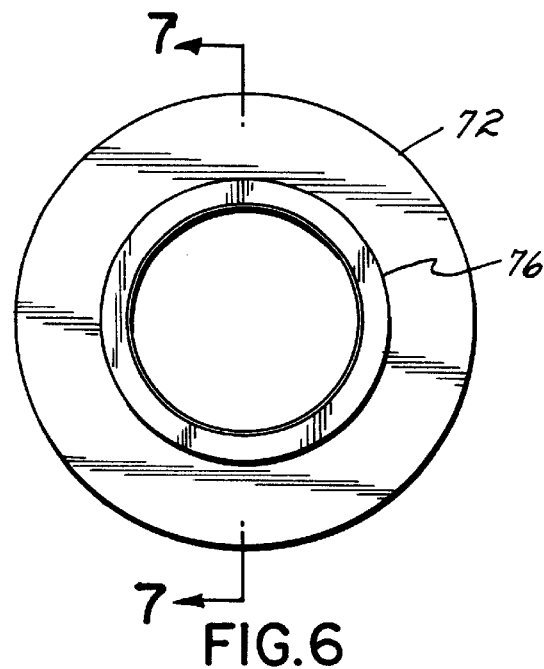
FIG. 6 is an enlarged plan view of a spacer of FIG. 5.
Figure 7:
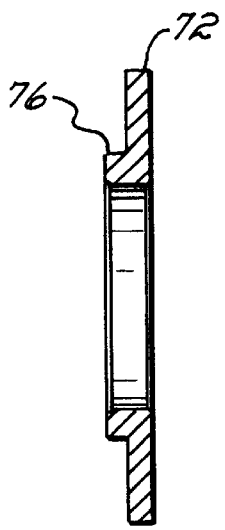
FIG. 7 is a sectional view of the spacer in FIG. 6 taken along line 7—7.

The spacer 72 includes a circumferentially extending mounting flange 76 that frictionally engages the rolling element bearing. If a spacer is used, the spacer can be formed from a rigid plastic such as rigid polyethylene, nylon or Teflon®. Not only does the spacer engage the inner race of the rolling element bearing as shown in FIGS. 3 and 5, but the spacer also acts as a seal to prevent contaminants from entering into the rolling element bearing. As the spacer engages the inner race 66 of the rolling element bearing, it passes the thrust load of the roller through the spacer to the body member.

FIG. 8 illustrates one example of the conveyor platform having drive shafts that could be used for supporting a plurality of different cluster roller assemblies of the present invention. Although various types of loader configurations can be used, the following description is only one type of example of a loader configuration where different zones having left hand and right hand cluster roller assemblies are used.

One example of the conveyor platform 150 of the present invention includes a frame 152 having side walls 154, 155 and a central wall 156 all of which are secured to end walls 157, 158 and extend longitudinally of the platform. A plurality of drive shafts 160, 162, 164, 166, 168, 170 are journaled between the side wall 154 and the central wall 156. Similarly, drive shafts 172, 174, 176, 178, 180 and 182 are journaled between the side wall 155 and the central wall 156.

A plurality of cluster roller assemblies 184, each having six helical barrel shaped rollers 186, are rotatably mounted on first and second drive shafts by locking pins. The cluster roller assemblies 184 include right hand clusters and left hand clusters. The left hand cluster roller assemblies are mounted on drive shafts 166, 168, 170, 172, 174, 176; and the cluster roller assemblies on drive shafts 160, 162, 164, 178, 180 and 182 are right hand clusters. Four cluster roller assemblies 184 are mounted on each drive shaft, with certain of the cluster roller assemblies illustrated only by an uppermost one of the rollers 186 in position to engage and support the flat bottom surface of a container, pallet, flat bottomed article or the like.

The cluster roller assemblies 184 on drive shafts 160, 162, 164 all have the axes of their uppermost rollers 186 angled at approximately 45 degree angle to the right relative to the central wall 156 and lie in a container supporting zone A. The axes of the uppermost rollers 186 of the cluster roller assemblies 184 are secured to the drive shafts 178, 180, 182 in zone D are parallel to those in zone A. Similarly, the axes of the upper rollers 186 of the cluster roller assemblies keyed to drive shafts 166, 168, 170 in a zone B; and the axes of the upper rollers 186 keyed to drive shafts 172, 174 and 176 in a zone C are parallel to each other and normal to the axes of the upper rollers 186 in zones A and D. Thus the cluster roller assemblies 184 in zones A and D are right hand clusters, while the clusters in zone B and C are left hand clusters.

As illustrated, a first hydraulic motor M1 in zone A is secured to the platform frame 152 and is connected to drive shaft 160 by a first chain drive 190. A second chain drive 192 connects drive shaft 160 to drive shaft 162, while a third chain drive 194 connects drive shafts 162 and 164 together. Thus, all drive shafts and rollers 186 of zone A will be rotated in the same direction and at the same speed by motor M1 when driven in either direction by a controller. Furthermore, when the motor M1 is driven in a clockwise direction (when observing the drive shafts 160, 162, 164 from the lower end) all of the rollers 186 in zone A rotate clockwise at the same speed; and when driving the motor M1 in a counterclockwise direction all of the rollers in zone A are driven in a counterclockwise direction.

Similarly, an independently controlled reversible hydraulic motor M2 drives drive shafts 166, 168, 170 of zone B through chain drives 196, 198, 200 in the same direction and at the same speed either in a counterclockwise or clockwise direction. A hydraulic motor M3 drives the drive shafts 172, 174, 176 and rollers 186 in zone C at the same speed and in the selected direction by chain drives 202, 204, 206 depending upon the direction of rotation of the motors M3; and a hydraulic motor M4 drives drive shafts 178, 180, 182 and their rollers 186 of zone D through chain drives 208, 210, 212 in the selected direction and at the same speed.

As will be described hereinafter, all of the motors, when driven, will drive the rollers in their zones in the selected direction and at the same speed as the rollers in one or more of the other zones.

Prior to describing the several directions in which a container (or other flat bottomed articles) may be propelled while supported on the rollers 186, it is believed that it would be helpful in understanding the conveyor platform to briefly describe the driving forces exerted by the freely rotatable rollers 186 on the bottom of the containers.

If the motor M1 drives all cluster roller assemblies 184 and thus the rollers in zone A in a clockwise direction, the trailing end (i.e., the lower left end in FIG. 2) of each roller 186 that is in contact with the container, will be moved upwardly into driving contact with the container while the forward ends (i.e., the right ends of the rollers in zone A) will be moved downwardly away from the container. Thus, the driving forces of the rollers in zone A will be parallel with the axes of the freely rotatable rollers and will be directed upwardly to the right as viewed in FIG. 8. If the cluster roller assemblies 184 of rollers 186 in zone A are driven in a counterclockwise direction the driving force against the container would be downwardly and to the left as viewed in FIG. 8.

The several directions in which a container supported on the platform 150 can be driven will now be described.

When it is desired to drive the container to the right all drive shafts in zones A, B, C and D are driven in a clockwise direction (viewed from the bottom of FIG. 8) thus moving the container to the right.

If the container is to be driven to the left, all drive shafts in zones A, B, C and D are driven in a counterclockwise direction.

If the container is to be driven diagonally, upwardly and to the right at a 45 degree angle, all of the drive shafts and their rollers in zones A and D will be driven in a clockwise direction, while the rollers in zones B and C will be held stationary. It will be appreciated that the freely rotatable rollers 186 in zones B and C will provide support but no driving force to the container and will freely roll permitting the container to be driven upwardly and to the right.

If the container is to be driven diagonally downwardly and to the left, the drive shafts and their rollers in zones A and D will be driven in a counterclockwise direction and the drive shafts in zones B and C will be held stationary allowing the supporting rollers in zones B and C to freely roll.

If the container is to be driven diagonally upwardly to the left, the drive shafts in zones B and C are driven in a clockwise direction and the drive shafts in zones A and D are held from rotation.

When the container is to be driven diagonally downwardly and to the right, the drive shafts in zones B and C are driven in a clockwise direction and the drive shafts in zones A and D are held stationary.

When the container is to be driven in a clockwise direction about a vertical axis, the drive shafts in zones A and B are driven in a clockwise direction, and the drive shafts in zones C and D are driven in a counterclockwise direction.

When the container is to be driven in a counterclockwise direction about a vertical axis, the drive shafts in zones A and B are driven in a counterclockwise direction and the drive shafts in zones C and D are driven in a clockwise direction.

When the container is to be driven upwardly, the drive shafts in zones A and D are driven clockwise, and the drive shafts in zones B and C are driven counterclockwise.

When the container is to be driven downwardly, the drive shafts in zones A and D are driven counterclockwise, and the drive shafts in zones B and C are driven clockwise.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A cluster roller assembly for use in material handling of an article comprising:
   a body member for mounting on a driven shaft, said body member including a periphery having a plurality of roller support positions;
   a roller supported at each roller support position, each roller comprising:
      a central bore extending through opposite ends of the roller and defining an axis of rotation;
      a pair of bearing recesses formed at the opposite ends of the roller;
      a pair of rolling element bearings, each respectively fitted within one of the bearing recesses and each having an inner race;
      a roller shaft that extends through the central bore and rolling element bearings and engages at opposite ends thereof the body member; and
      a pair of spacers, each respectively engaged with the inner race of one of the rolling element bearings to pass a thrust load of the roller through the respective spacers to the body member.

2. A cluster roller assembly according to claim 1, wherein each of said rolling element bearings is sealed.

3. A cluster roller assembly according to claim 1, wherein each of said spacers includes a circumferentially extending mounting flange that frictionally engages said one rolling element bearing to retain said spacer thereto.

4. A cluster roller assembly according to claim 1, wherein each of said rollers is disposed at an acute angle relative to the axis of rotation of said body member.

5. A cluster roller assembly according to claim 1, wherein each of said rollers has an outer surface that is configured to trace a helical pattern of contact with the article.

6. A cluster roller assembly according to claim 1, wherein each of said rollers has a barrel shape.

7. A conveyor that permits translation or rotation of an article comprising:
   a frame;
   a plurality of drive shafts rotatably mounted on the frame and positioned substantially parallel to each other, wherein each drive shaft includes a plurality of cluster roller assemblies mounted thereon, said cluster roller assemblies each comprising:
      a body member having a periphery and a plurality of roller support positions along the periphery;
      a roller supported at each roller support position, each roller comprising:
         a central bore extending through opposite ends of the roller and defining an axis of rotation;
         a pair of bearing recesses formed at the opposite ends of the roller;
         a pair of rolling element bearings, each respectively fitted within one of the bearing recesses and each having an inner race;
         a roller shaft that extends through the central bore and engages at opposite ends thereof the body member; and
         a pair of spacers, each respectively engaged with the inner race of one of the rolling element bearings to pass a thrust load of the roller through the respective spacers to the body member.

8. A conveyor according to claim 7, wherein each of said rollers has a barrel shape.

9. A conveyor according to claim 7, wherein each of said rolling element bearing is sealed.

10. A conveyor according to claim 7, further comprising a locking pin interconnecting each body member and one of said plurality of drive shafts for locking the cluster roller assembly in a predetermined position on said drive shaft.

11. A conveyor according to claim 7, further comprising a motor and a controller connected to said motor for causing said motor to rotate in a desired direction so that the article is translated on said conveyor in a desired direction relative to said plurality of drive shafts.

12. A conveyor according to claim 7, further comprising a plurality of walk plates that define a planar surface, wherein a portion of each of said plurality of cluster roller assemblies extend upward beyond said plurality of walk plates to engage the article.

13. A conveyor according to claim 7, wherein each of said spacers includes a circumferentially extending mounting flange that frictionally engages said one rolling element bearing to retain said spacer thereto.

14. A conveyor according to claim 7, wherein each of said rollers is disposed at an acute angle relative to the axis of rotation said body member.

15. A conveyor according to claim 7, wherein each of said rollers has an outer surface that is configured to trace a helical pattern of contact with an article.

16. A roller used in a cluster roller assembly and configured to be supported for rotation on a body member, comprising:
   a central bore extending through opposite ends of the roller and defining an axis of rotation;
   a pair of bearing recesses formed at opposite ends of the roller;
   a pair of rolling element bearings, each respectively fitted within one of the bearing recesses and each having an inner race;
   a roller shaft that extends through the central bore; and
   a pair of spacers, each respectively engaged with the inner race of one of the rolling element bearings for passing a thrust load of the roller through the respective spacers to the body member.

17. A roller according to claim 16, wherein each of said spacers includes a circumferentially extending mounting flange that frictionally engages said one rolling element bearing.

* * * * *